United States Patent
Friesel

(10) Patent No.: US 8,299,956 B1
(45) Date of Patent: Oct. 30, 2012

(54) METHOD OF MANEUVERING A MOVING PLATFORM WITH ON-BOARD OBSTRUCTION

(75) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 342 days.

(21) Appl. No.: 12/764,545

(22) Filed: Apr. 21, 2010

(51) Int. Cl.
*G01S 13/00* (2006.01)
(52) U.S. Cl. .............................. 342/41; 701/21; 701/23
(58) Field of Classification Search .................. 342/41; 701/21, 23
See application file for complete search history.

(56) References Cited

U.S. PATENT DOCUMENTS 7,729,820 B1 * 6/2010 Friesel et al. .................. 701/21
2008/0119970 A1 5/2008 Campbell et al.

OTHER PUBLICATIONS

Office Action dated Oct. 5, 2009 issued for U.S. Appl. No. 12/369,843 in the name of Friesel, Mark A. now U.S. Patent No. 7729820.

* cited by examiner

*Primary Examiner* — Timothy A Brainard
(74) *Attorney, Agent, or Firm* — Howard IP Law Group, PC

(57) ABSTRACT

A target in a mobile platform's obstructed zone can be cleared from the obstructed zone and engaged in the most time-efficient manner by determining the direction of the maneuver that would require the shortest amount of time to clear the target and then maneuvering the mobile platform in that direction.

10 Claims, 4 Drawing Sheets

METHOD OF MANEUVERING A MOVING PLATFORM WITH ON-BOARD OBSTRUCTION

CROSS-REFERENCE TO RELATED APPLICATION

This application is related to U.S. patent application Ser. No. 12/369,843 filed on Feb. 12, 2009, the contents of which is incorporated herein by reference.

FIELD OF THE INVENTION

This disclosure generally relates to a method of guiding a maneuverable mobile platform such as a vehicle or ship for engaging and/or observing a plurality of targets.

BACKGROUND

Many armed military vehicles generally have some blind spots or obstructed zones and do not have the ability to engage hostile targets with the onboard weaponry with 360° coverage. For example, on many armed military ships, some on-deck structure such as the ship's superstructure impose obstructions to the on-board weaponry. The area around the ship that can not be reached by the on-board weaponry because of the on-deck obstructions is identified as the ship's obstructed zone. So such a ship does not have 360° clearance for its weaponry and the ship can not engage any hostile targets that are in the ship's obstructed zone. When hostile targets are in the ship's obstructed zone, the ship must maneuver to bring the targets out of the obstructed zone (i.e. clear the targets) in order to engage them. When multiple hostile targets are in the ship's obstructed zone, it would be desirable to know the most time efficient way of maneuvering the ship to clear and engage each of the multiple hostile targets. The maneuver consists of a constant radius, constant speed turn to port or starboard.

SUMMARY

According to an implementation of the present disclosure, a method of maneuvering a mobile platform such as a vehicle or ship for clearing a target that is in the platform's obstructed zone comprises (a) obtaining the target's position at a first point in time; (b) determining the target's bearing associated with the target position at the first point in time; (c) calculating the amount of time needed to clear the target from the obstructed zone in each of the starboard side and the port side maneuver direction; (d) selecting the maneuver direction with the shorter amount of time needed to clear the target from the obstructed zone; and (e) maneuvering the platform by turning the platform in the selected maneuver direction, whereby the target is cleared from the platform's obstructed zone. The solution can be adapted to obtain numeric solutions for accurate maneuvering of the platform for clearing a moving target. Preferably, an accurate way of determining the most time efficient way of maneuvering the ship is by considering both the rotation (i.e. change in the ship's bearing) and the translation (i.e. change in the ship's position) of the ship during the maneuver in calculating the amount of time needed to clear the target from the obstructed zone in the step (c).

According to another embodiment of the present disclosure, a machine-readable storage medium encoded with a computer program code is disclosed. When the computer program code is executed by a processor, the processor performs a method for maneuvering a mobile platform summarized above and described in detail below.

According to another embodiment, an on-board system controller is provided on the mobile platform wherein the on-board system controller comprises the machine-readable storage medium mentioned above.

The advantage of the method disclosed herein is that it results in the minimum time to clear the targets.

BRIEF DESCRIPTION OF THE DRAWINGS

These and other features and advantages of the present invention will be more fully disclosed in the following detailed description of a preferred embodiment of the invention, which is to be considered together with the accompanying drawings wherein like numbers refer to like parts, and further wherein.

Figure 1:
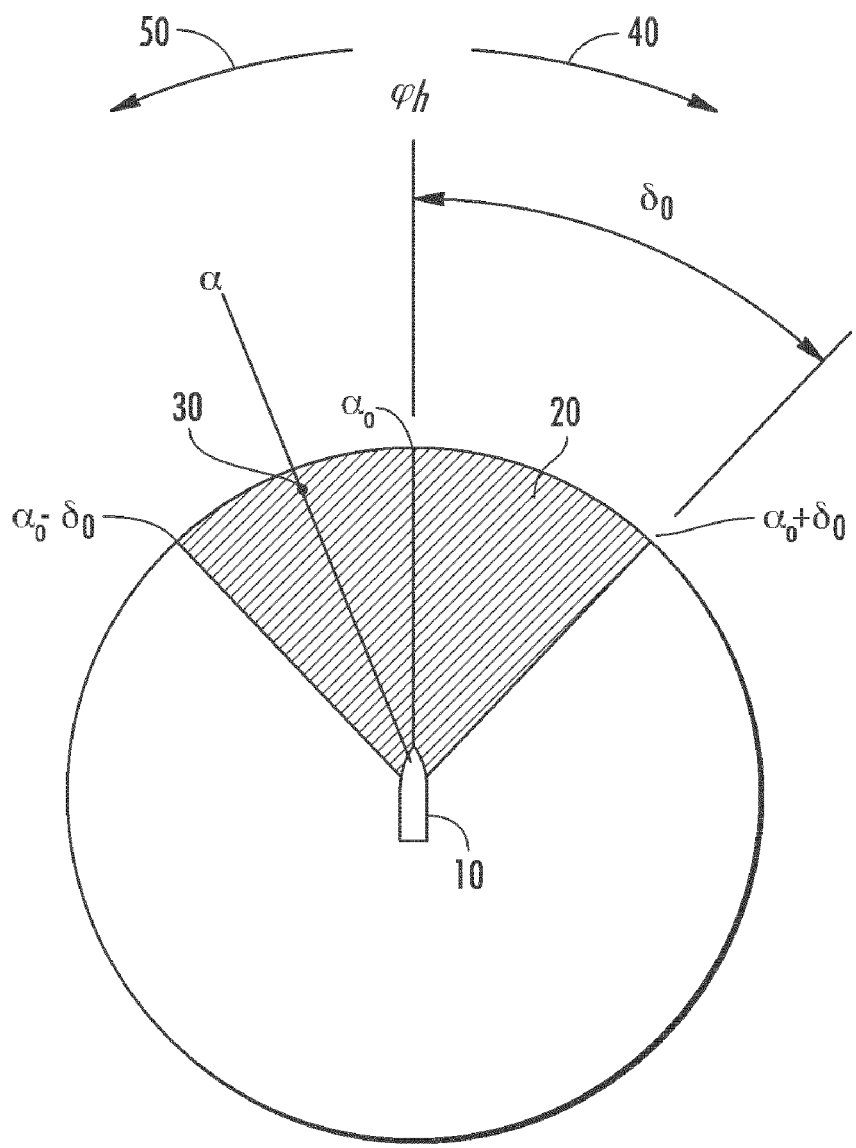
FIG. 1 is a schematic top-down view of a ship as an exemplary mobile platform and its obstructed zone in which is located a target.

All drawings are schematic and are not intended to show any dimensions to scale.

DETAILED DESCRIPTION

This description of the preferred embodiments is intended to be read in connection with the accompanying drawings, which are to be considered part of the entire written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

The problem addressed by the method of the present disclosure is to find the shortest time required to clear a target in the mobile platform's obstruction zone and the corresponding action required to clear the target in the shortest time. The method is applicable to any maneuverable mobile platform such as a vehicle or ship carrying a weapon or a sensor that has an obstructed zone. For illustrative purposes, however, the following detailed description will use a ship as an example. When applied to a more general maneuverable platform, the starboard and port maneuvering directions discussed in the ship example would correspond to clockwise and counter-clockwise directions.

The ship's maneuver involves turning its heading either in starboard or port direction by some angle. For the method of the present disclosure, constant turning radius and constant speed and, thus, a constant turning rate $\phi$ are assumed for the ship's maneuver and the target is assumed to be stationary.

An exemplary case considering both the rotation and translation of a ship 10 will be described. Referring to FIG. 1 the ship 10 is in motion and has a heading $\phi_h$. The ship 10 has an on-board obstruction that defines an obstructed zone 20 ahead of the ship. The on-board obstruction is assumed to be symmetrical with respect to the platform's heading $\phi_h$ and thus the center bearing $\alpha_0$ of the obstruction is the same as the platform heading $\phi_h$. A target 30 is in the obstructed zone 20 and the mobile platform 10 must maneuver to clear the target 30 out of the obstructed zone 20 and preferably in the most efficient manner that will require the least amount of time to clear the target 30. The method described herein will accommodate situations where the target 30 is stationary or in motion.

Figure 2:
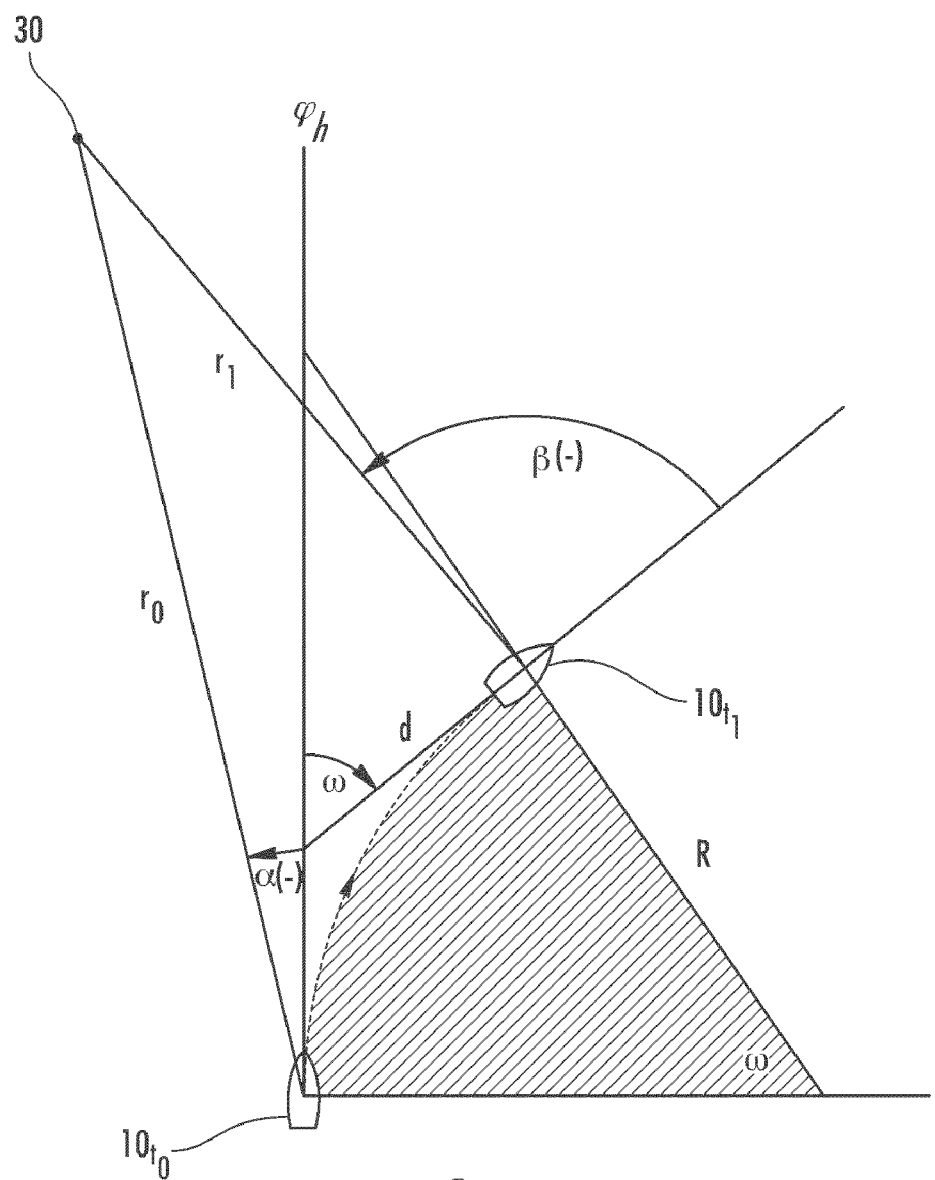
FIG. 2 is a schematic illustration showing the geometry involved in an exemplary starboard maneuver of the mobile platform according to an embodiment of the present disclosure.

$\alpha$ denotes the initial relative target azimuth in this system and other angles and parameters are as indicated in FIG. 2. FIG. 2 shows the geometries involved in the ship's maneuver to clear the target 30 from its obstruction zone 20. The ship's initial position at time $t_0$ is shown as 10$t_0$ and the ship's position at some later time $t_1$ after a starboard maneuver by a turn angle $\omega$ is shown as 10$t_1$. For purposes of the present disclosure the following definitions apply:

| | |
|---|---|
| $r_0 =$ | the position vector of a target at an initial time $t_0$, |
| $r_1 =$ | the position vector of a target at some time $t_1$ after $t_0$, |
| $v_t =$ | the velocity vector of a target, |
| $v_{os} =$ | ship velocity, |
| $\Delta t =$ | a maneuver duration $t_1 - t_0$, |
| $s =$ | arc length of ship's turning circle, |
| $R =$ | ship turn radius, |
| $\phi_h =$ | ship heading, |
| $\dot\phi =$ | ship heading turn rate, |
| $\alpha =$ | angular position of a target relative to $\phi_h$ (i.e. relative target azimuth) at $t_0$, |
| $\alpha_0 =$ | center bearing of an obstruction relative to North or other common reference rather than to the ship heading $\phi_h$, |
| $\delta_0 =$ | angular width of the obstruction zone from the center bearing $a_0$, thus the total width of the obstruction zone is $2\delta_0$, |
| $\theta_t =$ | target bearing obstruction relative to North or other common reference rather than to the ship heading $\phi_h$, |
| $\beta =$ | relative clearance angle (i.e. relative clearance azimuth), e.g. $\theta_t - (\alpha_0 + \delta_0)$ for port turn, $\theta_t - \alpha_0 + \delta_0$ for starboard, |
| $\omega =$ | ship turn angle for the maneuver. |

The ship 10 can turn at a constant heading turn rate $\dot\phi$ in either the starboard direction 40 or the port direction 50 to clear the target 30 with minimum maneuver time. The goal then is to find the maneuver time $\Delta t$ required to move the relative target azimuth $\alpha$ from its initial value to a known relative clearance angle $\beta$ required for clearance. The minimum $\Delta t$ of port and starboard maneuvers may indicate the preferred turn direction. The ship's heading turn rate $\dot\phi$ is assumed to be constant so the ship's turn angle $\omega = \dot\phi\Delta t$, and it follows that $R = v_{os}/\dot\phi$ is known. The target state vector, containing the target position vector $r$ and velocity vector $\omega$, is assumed to be known from observation data. For example, such observation data can be obtained from the ship's radar.

In the simple case where the purpose of the maneuver is to clear a target from the ship's obstruction zone, two values of $\beta$ correspond to the angles to clear on either side of the onboard obstruction relative to the ship's heading. Conversion to true azimuth requires only that the ship heading $\phi_h$ be added to these relative values.

Solution

The solution of trigonometric problems from a correct initial set-up usually precludes the need to artificially set the signs of factors during computation. In the present case there is a juxtaposition of coordinate systems required for the solution, and the sign of the R terms must compensate for the sign of $\omega$ for starboard and port maneuvers. The starboard turn maneuver equations are found from the general components of $r_0$, $r_1$, and ship displacement. These are $$r_0 \sin(\alpha) + v_t \cos(\gamma)\Delta t = r_1 \sin(\beta+\omega) + R - R\cos(\omega),$$

$$r_0 \cos(\alpha) + v_t \sin(\gamma)\Delta t = r_1 \cos(\beta+\omega) + R\sin(\omega). \quad (1)$$

Eliminating $r_1$, and expanding and collecting terms gives, $$[r_0 \sin(\alpha-\beta) + v_t\Delta t\cos(\gamma+\beta) - R\cos(\beta)]\cos(\omega) - [r_0 \cos(\alpha-\beta) - v_t\Delta t\sin(\gamma+\beta) - R\sin(\beta)]\sin(\omega) + R\cos(\beta) = 0$$

This equation lends itself to a simple binomial solution for $\sin(\omega)$ or $\cos(\omega)$. The quadratic solution for $\sin(\omega)$ is $$\sin(\omega) = \frac{1}{2A}\left[-B \pm \sqrt{B^2 - 4AC}\right] \quad (2).$$

If the target velocity $v_t = 0$, $$A = r_0^2 + R^2 - 2Rr_0\sin(\alpha)$$

$$B = -2R\cos(\beta)[r_0\cos(\alpha-\beta) - R\sin(\beta)]$$

$$C = r_0\sin(\alpha-\beta)[2R\cos(\beta) - r_0\sin(\alpha-\beta)],$$

Then, the time $\Delta t$ required to clear the target 30 by maneuvering the ship for a turn angle of $\omega$ is calculated from the relationship $\omega = \dot\phi\Delta t$.

For the port turn maneuver, the sines of $\alpha$ and $\beta$ are inherently positive for conditions symmetric to FIG. 2 while $\omega$ is negative, so $$A = r_0^2 + R^2 + 2Rr_0\sin(\alpha)$$

$$B = 2R\cos(\beta)[r_0\cos(\alpha-\beta) + R\sin(\beta)]$$

$$C = -r_0\sin(\alpha-\beta)[r_0\sin(\alpha-\beta) + 2R\cos(\beta)] \quad (3)$$

with the appropriate solution differing in the sign of the radical. Where multiple coordinate systems are involved care must be taken to ensure that the signs of trigonometric terms correspond to the desired solution. In other quadrants, attention is to be paid to the sign of the cosine terms, however these cases and various special cases are easily accounted for. Finally, the solution for $r_1$ is readily obtained by substitution of the solution for $\omega$ into equations (1).

Non-Zero Target Velocities

From the above, it is clear that various approaches are available for solutions with non-zero target velocities, e.g. in equations (1) the trigonometric terms in $\omega$ may be expanded to obtain equations in various powers of $\Delta t$. For example, if $\omega$ is sufficiently small, replacing the pertinent trigonometric terms with their first order expansions gives, $$r_0\sin(\alpha) + v_t\cos(\gamma)\Delta t = r_1\left[\sin(\beta) - \frac{v_{os}\Delta t\cos(\beta)}{R}\right] \quad (4)$$

$$r_0\cos(\alpha) + v_t\sin(\gamma)\Delta t = r_1\left[\cos(\beta) - \frac{v_{os}\Delta t\sin(\beta)}{R}\right] + v_{os}\Delta t.$$

Since we have that $\omega = v_{os}\Delta t/R$, this yields a simple quadratic equation in $\Delta t$ by eliminating $r_1$ from (4).

Iterative solutions of equation (2) can also be a useful approach, for example, by assuming that $v_{os}$ or $\dot\phi$ are not initially maximized. For example, a very simple solution using variable $v_{os}$ gives a non-optimal $\Delta t$ (non-minimum time) result from the static target solution by first estimating the threat position upon completion of the maneuver and adding $v_t\Delta t$. An updated estimate for turn rate $\dot\phi$ is found from equations (1). In other words, finding ω from equation (2) with $v_t=0$ determines the components of the vector $r_1$.

For the case of non-zero target velocities $v_t$, since the target velocity $v_t$ is known, a non-optimal estimate of the final target position, taking into account target velocity, is just $r_f = r_1 + v_t \Delta t$. Substituting $r_f = |r_f|$ for $r_1$ in equations (1) allows the explicit $v_t \Delta t$ to be eliminated from the equations, giving, $$\lfloor r_f \sin(\beta+\omega) + R - R\cos(\omega) - r_0 \sin(\alpha) \rfloor \sin(\gamma) = \lfloor r_f \cos(\beta+\omega) + R\sin(\omega) - r_0 \cos(\alpha) \rfloor \cos(\gamma).$$

This equation can be solved for $\sin(\omega)$ or $\cos(\omega)$ which yields a new estimate of the ship heading turn rate $\dot\phi$ given the $\Delta t$ found in the initial iteration.

Example

Starboard Turn

In an example where the turn radius $R=1$, the initial target distance $r_0=1$, the target angle with respect to the obstruction center angle $\alpha=0$, and the angle to clear Port $\beta=-\pi/2$, the solution $\omega=\pi/4$ is evident. From the first set of coefficient formulas above, $A=2$, $B=0$, and $C=-1$, the two solutions are $\sin(\omega)=\pm 1/\sqrt{2}$. Because this is a starboard turn the position solution applies and $\omega=\sin^{-1}(1/\sqrt{2})=\pi/4$. Given the constant ship heading turn rate $\dot\phi$, the time to clear is $\Delta t=\omega/\dot\phi$.

Example

Port Turn

In another example where the turn radius $R=1$, the initial target distance $r_0=1$, the target angle with respect to the obstruction center angle $\alpha=0$, and the angle to clear Port $\beta=\pi/2$, the solution $\omega=-\pi/4$ is evident. From the first set of coefficient formulas above, $A=2$, $B=0$, and $C=1$, the two solutions are $\sin(\omega)=\pm 1/\sqrt{2}$. Because this is a port turn the negative solution applies and $\omega=\sin^{-1}(-1/\sqrt{2})=-\pi/4$. Given the constant ship heading turn rate $\dot\phi$, the time to clear is $\Delta t=\omega/\dot\phi$ with the port heading turn rate inherently negative.

Figure 3:
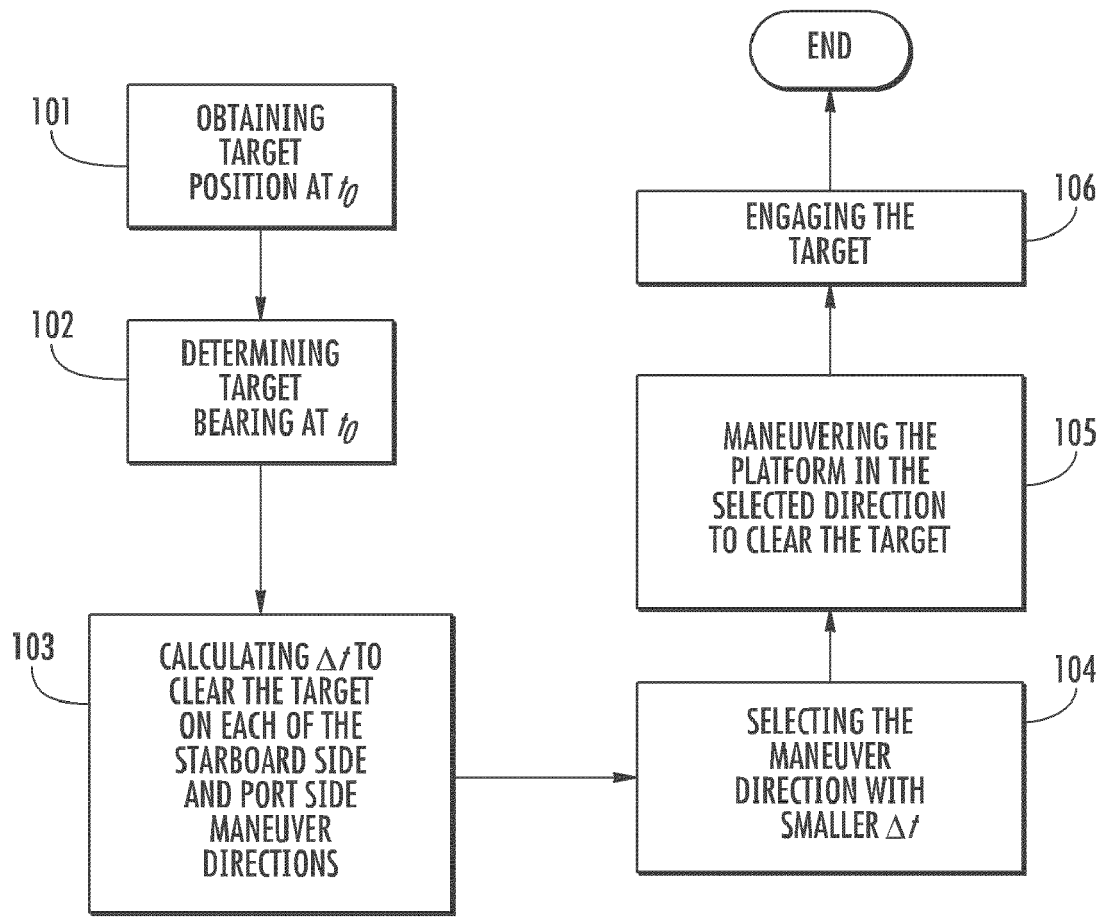
FIG. 3 is a flowchart illustrating the method of the present disclosure.

Referring to FIG. 3, the method described above is summarized in the flowchart 100. The initial position information of the target 30 at time $t_0$ in the obstructed zone 20 is obtained and provided to the ship's on-board system controller. The target's position data can be obtained by an on-board radar system (not shown), for example. (See block 101). The ship's system controller also controls the ship's propulsion system and maneuvers the ship 10. From the target's position data, the system controller determines the target's bearing, the target position vector $r_0$ and the target velocity vector $v_0$. (See block 102). Next, the ship's on-board system controller calculates the amount of time required $\Delta t$ to clear the target in each of the starboard side and the port side. (See block 103). In calculating the $\Delta t$'s, by considering both the rotation (i.e. change in the ship's bearing) and the translation (i.e. change in the ship's position) of the ship during the maneuver provides accurate $\Delta t$'s. Estimating the $\Delta t$'s as accurately as possible is useful so that the appropriate engagement action (to destroy or disable) against the target can be coordinated. Next, the ship's on-board system controller selects the maneuver direction associated with the smaller $\Delta t$. (See block 104). The on-board system controller then maneuvers the ship in the selected direction to clear the target 30. (See block 105). Once the target 30 is cleared from the obstructed zone 20, the ship can readily engage the target 30 with an appropriate action. For example, if the target 30 is an hostile vehicle, appropriate actions can be taken to destroy or disable the target 30.

Figure 4:
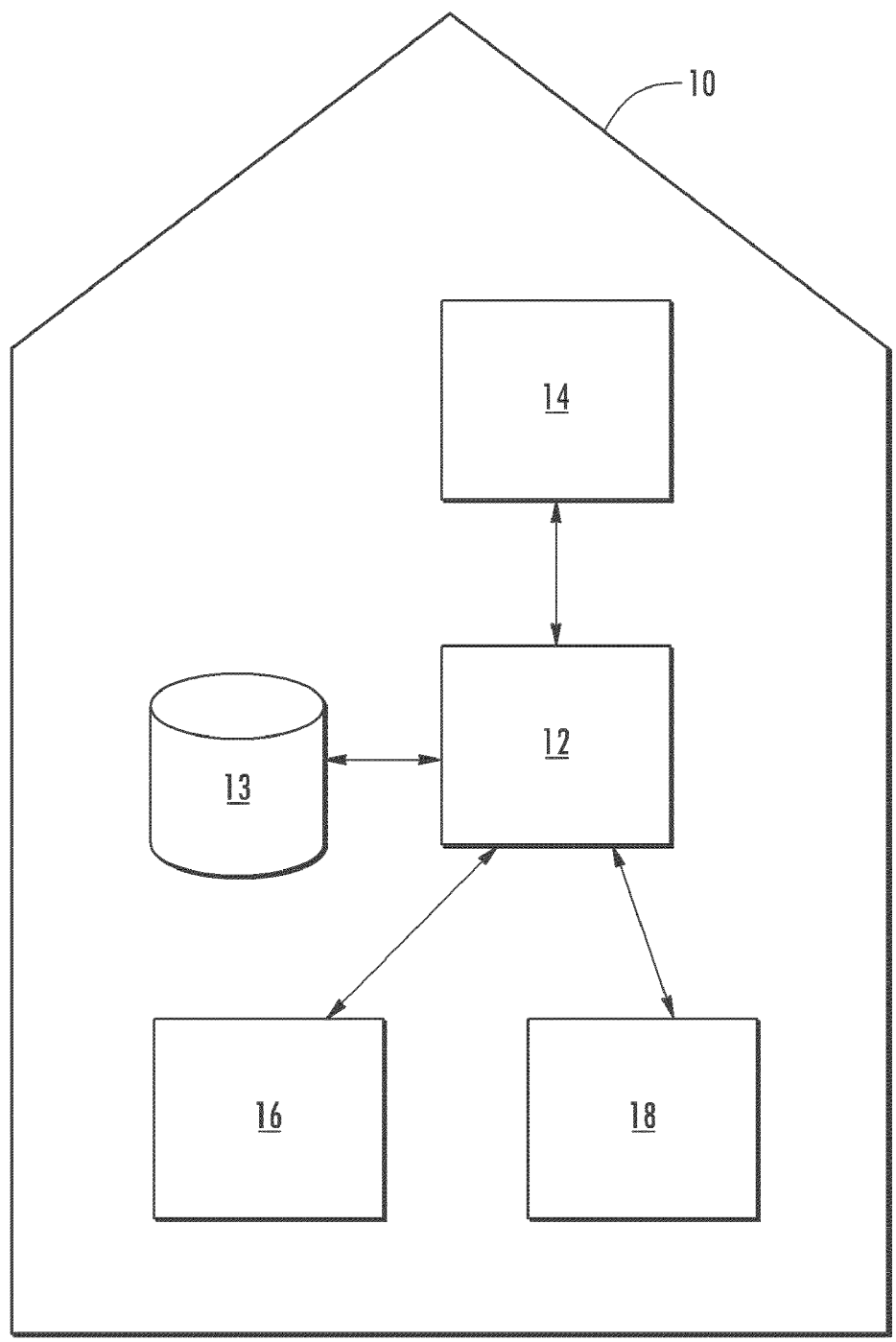
FIG. 4 is a schematic illustration of an example of the mobile platform of the present disclosure.

Referring to the schematic illustration of shown in FIG. 4, the mobile platform 10 discussed herein can comprise the on-board system controller 12, the on-board radar system 14, a propulsion system 16 (e.g. engine) appropriately configured to propel the mobile platform and a steering system 18 (e.g. rudders in the case of a ship) that is appropriately configured to maneuver the mobile platform. These sub-systems of the mobile platform 10 are configured and linked to each other enabling the on-board system controller 12 to control and coordinate the operations of the various sub-systems in executing the method disclosed herein.

The method and systems disclosed herein encompasses a machine-readable storage medium 13 encoded with computer program code, such that, when the computer program code is executed by a processor, such as the on-board radar system 14, the processor performs the method for maneuvering the mobile platform 10 described herein. Such machine-readable storage medium 13 can be a single data storage unit or storage system comprising multiple data storage units that are connected to the on-board system controller 12 and may include magnetic, optical or solid-state storage media, or a combination thereof, for example. The machine-readable storage medium 13 can also include portable machine-readable storage devices such as a random access memory device, a read only memory device, a magnetic medium such as a hard-drive or a floppy disk, or an optical medium such as a Compact Disc, a DVD, etc. that are loaded on to the on-board system controller 12 to allow the on-board system controller 12 to access the computer program code encoded thereon.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of maneuvering a mobile platform for clearing and engaging a target that is in the platform's obstructed zone, said method comprising:
   (a) obtaining the target's position at a first point in time;
   (b) determining the target's bearing associated with the target position at the first point in time;
   (c) calculating an amount of time needed to clear the target from the obstructed zone in each of a starboard side and port side maneuver direction by considering both a rotation and translation of the mobile platform during the maneuver;
   (d) selecting the maneuver direction with a shorter amount of time needed to clear the target from the obstructed zone; and
   (e) maneuvering the platform by turning the platform in the selected maneuver direction, whereby the target is cleared from the platform's obstructed zone.

2. The method of claim 1, further comprising engaging the target after the target is cleared from the platform's obstructed zone.

3. The method of claim 1, wherein the selected maneuver direction is clockwise or counter-clockwise.

4. The method of claim 1, wherein the platform is a ship and the selected maneuver direction is starboard side or port side.

5. A machine-readable storage medium encoded with computer program code, such that, when the computer program code is executed by a processor, the processor performs a method for maneuvering a mobile platform for clearing a target that is in the platform's obstructed zone, said method comprising:

(a) obtaining the target's position at a first point in time;
(b) determining the target's bearing associated with the target position at the first point in time;
(c) calculating an amount of time needed to clear the target from the obstructed zone in each of a starboard side and port side maneuver direction by considering both a rotation and translation of the mobile platform during the maneuver;
(d) selecting the maneuver direction with a shorter amount of time needed to clear the target from the obstructed zone; and
(e) maneuvering the platform by turning the platform in the selected maneuver direction, whereby the target is cleared from the platform's obstructed zone.

6. The machine-readable storage medium of claim 5, wherein the maneuver direction is clockwise or counter-clockwise.

7. The machine-readable storage medium of claim 5, wherein the platform is a ship and the maneuver direction is starboard side or port side.

8. An on-board system controller provided on a mobile platform for clearing a target that is in the platform's obstructed zone, the on-board system controller comprising: a machine-readable storage medium encoded with computer program code, such that, when the computer program code is executed by a processor, the processor performs a method for maneuvering a mobile platform for clearing a target that is in the platform's obstructed zone, said method comprising:

(a) obtaining the target's position at a first point in time;
(b) determining the target's bearing associated with the target position at the first point in time;
(c) calculating an amount of time needed to clear the target from the obstructed zone in each of a starboard side and port side maneuver direction by considering both a rotation and translation of the mobile platform during the maneuver;
(d) selecting the maneuver direction with a shorter amount of time needed to clear the target from the obstructed zone; and
(e) maneuvering the platform by turning the platform in the selected maneuver direction, whereby the target is cleared from the platform's obstructed zone.

9. The on-board system controller of claim 8, wherein the maneuver direction is clockwise or counter-clockwise.

10. The on-board system controller of claim 8, wherein the platform is a ship and the maneuver direction is starboard side or port side.

\* \* \* \* \*